US009033105B1

(12) United States Patent
Boswell

(10) Patent No.: US 9,033,105 B1
(45) Date of Patent: May 19, 2015

(54) ROTATABLE ELEVATED HUNTING BLINDS

(71) Applicant: Burl Boswell, Bossier City, LA (US)

(72) Inventor: Burl Boswell, Bossier City, LA (US)

( * ) Notice: Subject to any disclaimer, the term of this patent is extended or adjusted under 35 U.S.C. 154(b) by 10 days.

(21) Appl. No.: 13/965,599

(22) Filed: Aug. 13, 2013

(51) Int. Cl.
E06C 7/16 (2006.01)
A01M 31/02 (2006.01)
E04H 15/00 (2006.01)

(52) U.S. Cl.
CPC ............ *A01M 31/025* (2013.01); *E04H 15/001* (2013.01)

(58) Field of Classification Search
CPC ........................... A01M 31/02; A01M 31/025
USPC ............. 182/115, 116, 125, 179.1, 62.5, 187, 182/188; 135/90, 96, 97; 297/184.1, 297/184.14, 184.15, 184.17
See application file for complete search history.

(56) References Cited

U.S. PATENT DOCUMENTS

| | | | | |
|---|---|---|---|---|
| 1,092,096 A * | 3/1914 | Donigan | .................... | 182/62.5 |
| 2,647,022 A * | 7/1953 | Smid et al. | ....................... | 182/13 |
| 2,854,705 A | 10/1958 | McClaran | | |
| 2,998,861 A * | 9/1961 | Hotchkiss | ....................... | 182/2.3 |
| 3,169,543 A | 2/1965 | McGerty | | |
| 3,220,766 A * | 11/1965 | Kates | ....................... | 297/184.16 |
| 3,301,346 A * | 1/1967 | Verrell et al. | ................... | 182/2.4 |
| 3,709,322 A * | 1/1973 | Mitchell | ....................... | 182/62.5 |
| 3,967,694 A * | 7/1976 | Woolfolk, Sr. | ................... | 182/82 |
| 4,069,891 A * | 1/1978 | McClung | ....................... | 182/187 |
| 4,134,474 A * | 1/1979 | Stavenau et al. | .............. | 182/187 |
| 4,674,598 A * | 6/1987 | Sides et al. | .................... | 182/116 |
| 4,699,248 A * | 10/1987 | Roy | .............................. | 182/116 |
| 4,719,716 A | 1/1988 | Chrisley, Jr. | | |
| 4,819,763 A * | 4/1989 | Grote | ........................... | 182/187 |
| 5,009,283 A * | 4/1991 | Prejean | ........................ | 182/116 |
| 5,275,257 A * | 1/1994 | Robertson | ..................... | 182/116 |
| 5,327,993 A | 7/1994 | Stark, Sr. | | |
| 5,371,966 A | 12/1994 | Hall | | |
| 5,485,978 A * | 1/1996 | Hernandez | .................... | 248/165 |
| 5,491,921 A * | 2/1996 | Allen | ................................ | 42/94 |
| 5,842,540 A | 12/1998 | Mancini, Jr. | | |
| 5,862,827 A * | 1/1999 | Howze | ......................... | 135/88.01 |
| 5,868,218 A * | 2/1999 | Lawson | ....................... | 182/69.6 |
| 5,927,435 A * | 7/1999 | Benton | ......................... | 182/116 |
| 5,967,258 A * | 10/1999 | Scott et al. | ..................... | 182/113 |
| 6,347,684 B1 * | 2/2002 | Fath et al. | ..................... | 182/63.1 |
| 6,510,922 B1 * | 1/2003 | Hodnett | ........................ | 182/187 |
| 6,539,966 B2 * | 4/2003 | Raines et al. | ................... | 135/96 |
| 6,725,970 B2 * | 4/2004 | Garofalo | ....................... | 182/115 |
| 6,948,587 B2 * | 9/2005 | Griffiths | ......................... | 182/20 |
| 6,978,862 B1 | 12/2005 | Cotten, Sr. | | |
| 7,152,358 B1 * | 12/2006 | LeAnna et al. | .................. | 42/94 |

(Continued)

*Primary Examiner* — Katherine Mitchell
*Assistant Examiner* — Shiref Mekhaeil
(74) *Attorney, Agent, or Firm* — R. Keith Harrison

(57) ABSTRACT

A rotatable elevated hunting blind includes a plurality of enclosure support legs; an enclosure base carried by the enclosure support legs, the enclosure base having a stationary base sprocket; a hunting blind enclosure carried by the enclosure base, the hunting blind enclosure rotatable with respect to the enclosure base; a seat assembly having a seat carried by the hunting blind enclosure; and a user-operable blind enclosure rotation mechanism carried by the hunting blind enclosure adjacent to the seat of the seat assembly, the blind enclosure rotation mechanism having a drive sprocket and a chain meshing with the base sprocket of the enclosure base and the pedal sprocket, the blind enclosure rotation mechanism operable to rotate the drive sprocket around the chain as the blind enclosure rotation mechanism revolves around the enclosure base.

13 Claims, 13 Drawing Sheets

(56) References Cited

U.S. PATENT DOCUMENTS

| | | | |
|---|---|---|---|
| 7,219,680 B1 * | 5/2007 | Gresock | 135/90 |
| 7,246,630 B1 * | 7/2007 | Ransom et al. | 135/90 |
| 7,735,503 B2 * | 6/2010 | Jenkinson | 135/96 |
| 7,984,789 B2 * | 7/2011 | Michalec | 182/115 |
| 8,083,028 B2 * | 12/2011 | Johnson | 182/113 |
| 8,434,594 B2 * | 5/2013 | Zinsmeyer | 182/223 |
| 8,556,036 B1 * | 10/2013 | Meredith et al. | 182/188 |
| 8,777,254 B1 * | 7/2014 | Fowler | 280/656 |
| 2002/0074030 A1 * | 6/2002 | Raines et al. | 135/96 |
| 2002/0112919 A1 * | 8/2002 | Graham, Jr. | 182/116 |
| 2006/0249640 A1 * | 11/2006 | Hanson | 248/214 |
| 2007/0033853 A1 * | 2/2007 | Ridge | 43/1 |
| 2007/0144570 A1 * | 6/2007 | Cooper | 135/90 |

* cited by examiner

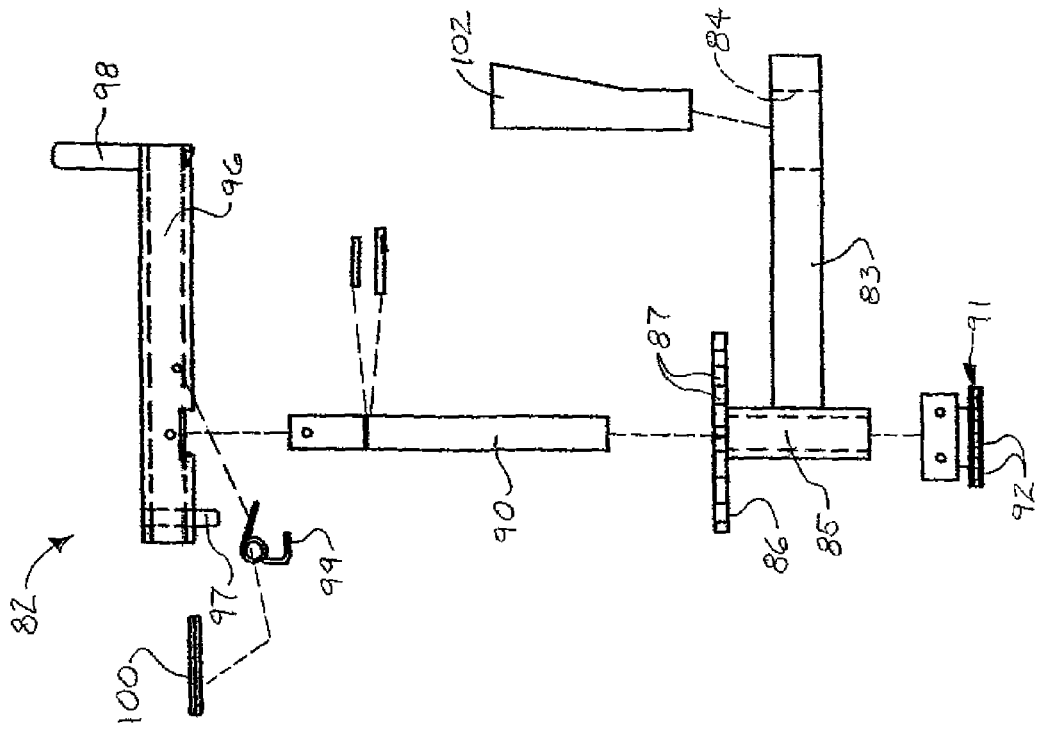
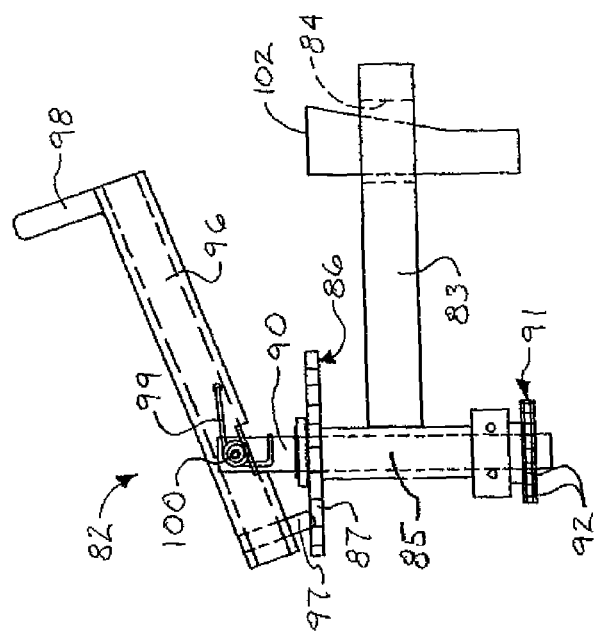
FIG. 14
FIG. 13

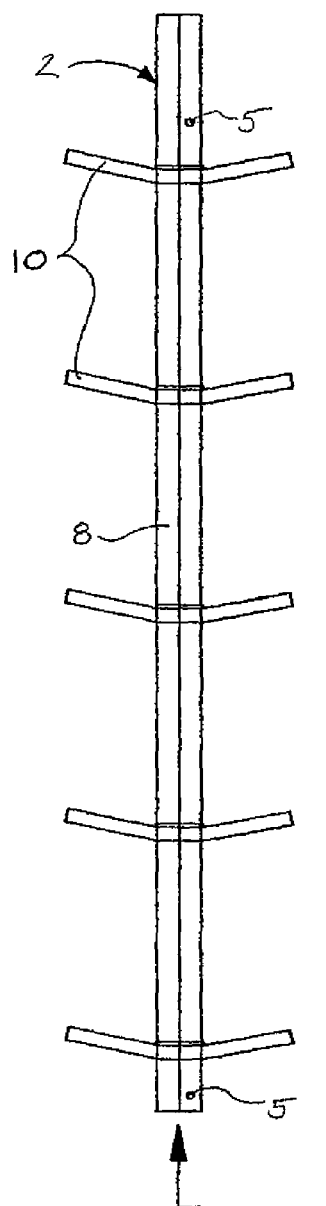
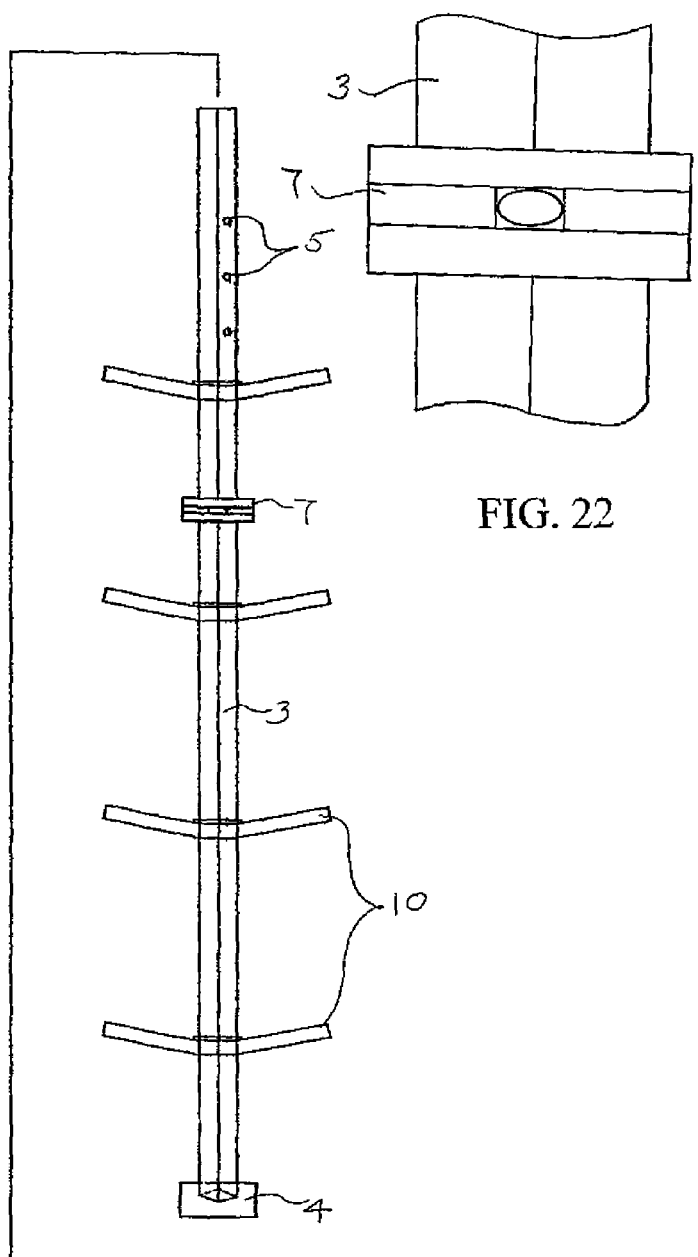
FIG. 22
FIG. 21

ROTATABLE ELEVATED HUNTING BLINDS

FIELD

Illustrative embodiments of the disclosure generally relate to hunting blinds such as deer stands and the like. More particularly, illustrative embodiments of the disclosure relate to rotatable elevated hunting blinds having a hunting blind enclosure which can be selectively rotated by a user to provide the user with a panoramic observation field.

BACKGROUND

Hunters and wildlife observers frequently use elevated hunting blinds such as deer stands for the purpose of enhancing their view of wildlife on the ground while being concealed from view. The hunting blind which encloses the observer may be fixed in position. Thus, one of the limitations of a conventional elevated hunting blind is that an observer may be limited to viewing the ground or area in the vicinity of the hunting blind on only one or two sides of the hunting blind.

Accordingly, rotatable elevated hunting blinds having a hunting blind enclosure which can be selectively rotated by a user to provide the user with a panoramic observation field may be desirable for some hunting and/or wildlife observation applications.

SUMMARY

Illustrative embodiments of the disclosure are generally directed to rotatable elevated hunting blinds which can be selectively rotated by a user to provide the user with a panoramic observation field may be desirable for some hunting and/or wildlife observation applications. An illustrative embodiment of the rotatable elevated hunting blind includes a plurality of enclosure support legs; an enclosure base carried by the enclosure support legs, the enclosure base having a stationary base sprocket; a hunting blind enclosure carried by the enclosure base, the hunting blind enclosure rotatable with respect to the enclosure base; a seat assembly having a seat carried by the hunting blind enclosure; and a user-operable blind enclosure rotation mechanism carried by the hunting blind enclosure adjacent to the seat of the seat assembly, the blind enclosure rotation mechanism having a drive sprocket and a chain meshing with the base sprocket of the enclosure base and the pedal sprocket, the blind enclosure rotation mechanism operable to rotate the drive sprocket around the chain as the blind enclosure rotation mechanism revolves around the enclosure base.

BRIEF DESCRIPTION OF THE DRAWINGS

Illustrative embodiments of the disclosure will now be described, by way of example, with reference to the accompanying drawings, in which:

FIG. 13 is a side view of an exemplary enclosure rotating pedal assembly according to an illustrative embodiment of the rotatable elevated hunting blinds;

FIG. 14 is an exploded side view of an exemplary enclosure rotating pedal assembly;

FIG. 21 is an exploded side view of an exemplary hunting blind support leg with multiple, spaced-apart step bars extending from the hunting blind support leg; and FIG. 22 is a front sectional view of a hunting blind support leg, with an exemplary level provided on the hunting blind support leg.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable users skilled in the art to practice the disclosure and are not intended to limit the scope of the claims. Moreover, the illustrative embodiments described herein are not exhaustive and embodiments or implementations other than those which are described herein and which fall within the scope of the appended claims are possible. Relative terms such as "upper", "lower", "front", "rear", "above", 'below", "top", "bottom", "horizontal" and "vertical" as used herein are intended for descriptive purposes only and are not necessarily intended to be construed in a limiting sense. Furthermore, there is no intention to be bound by any expressed or implied theory presented in the preceding technical field, background, brief summary or the following detailed description.

Figure 1:
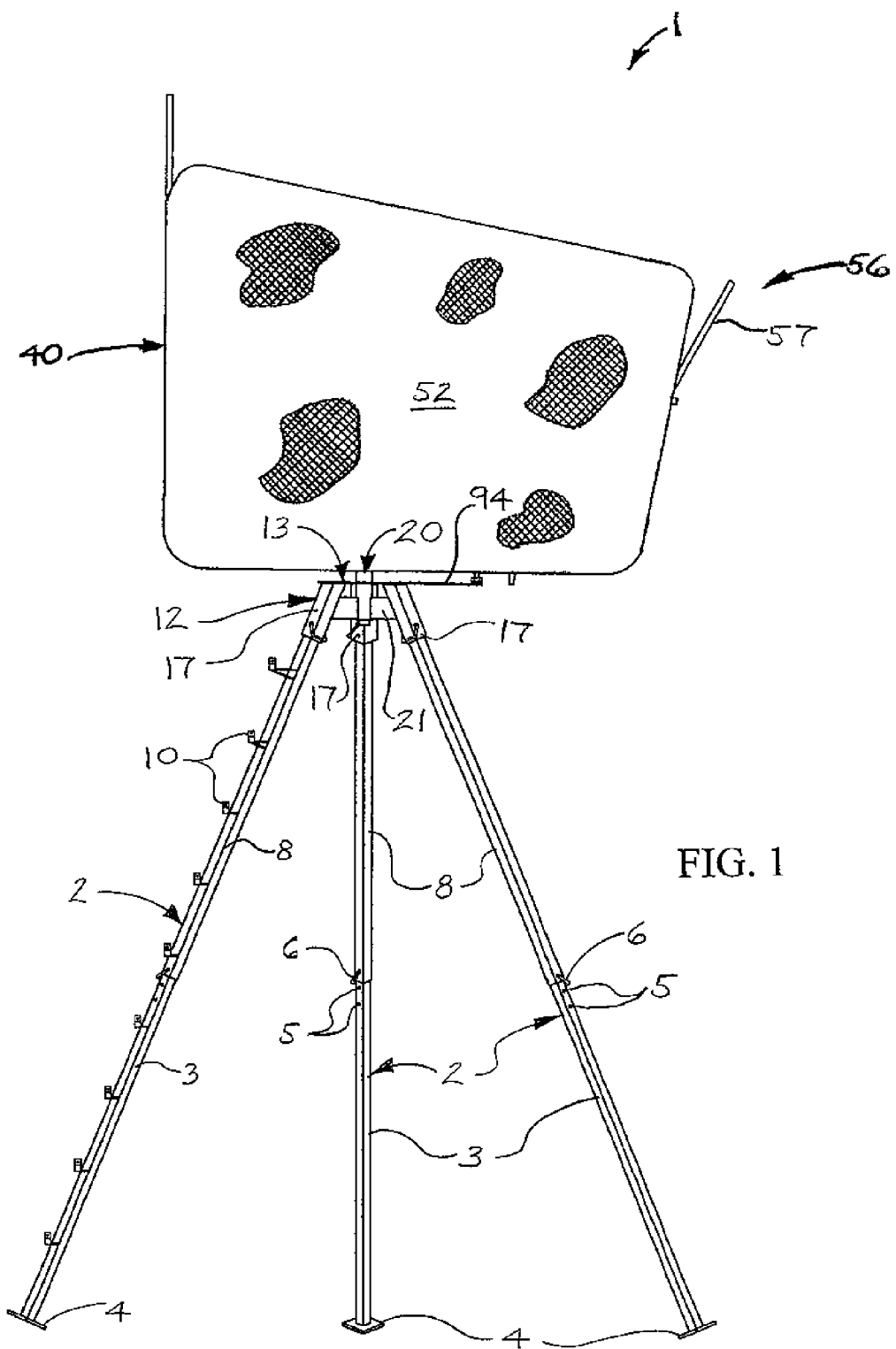
FIG. 1 is a side view of an illustrative embodiment of the rotatable elevated hunting blinds.
Figure 2:
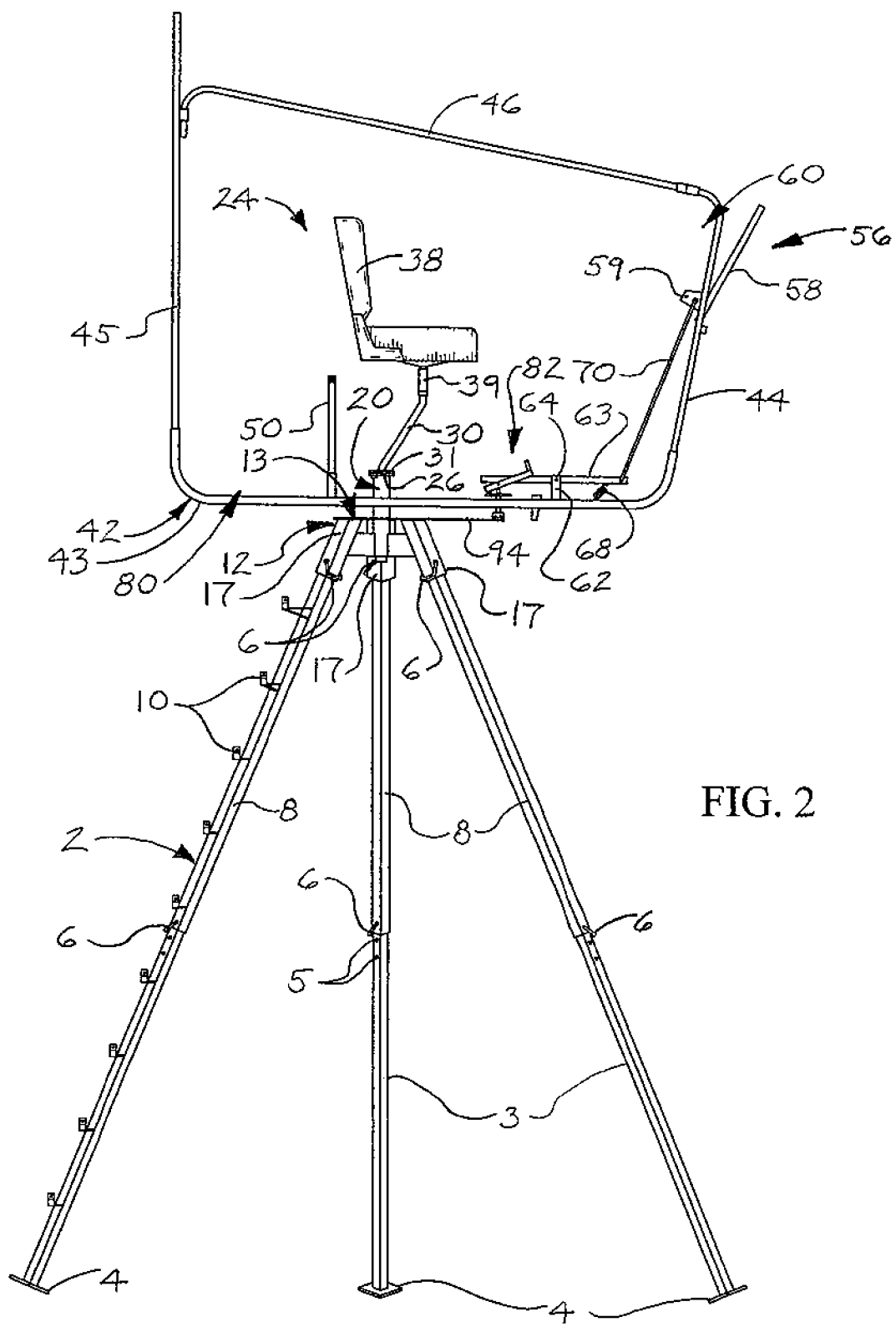
FIG. 2 is a side view of an illustrative embodiment of the rotatable elevated hunting blinds, with an enclosure canopy omitted from an enclosure frame of the hunting blind enclosure for clarity.

Referring initially to FIGS. 1 and 2 of the drawings, an illustrative embodiment of the rotatable elevated hunting blind is generally indicated by reference numeral 1 in FIG. 1. The rotatable elevated hunting blind 1 may include multiple, free-standing enclosure support legs 2. An enclosure base 12 may be supported by the enclosure support legs 2. A rotatable hunting blind enclosure 40 is supported by the enclosure base 12. As illustrated in FIG. 2, a seat assembly 24 is provided in the hunting blind enclosure 40. A port assembly 56 may be provided on the hunting blind enclosure 40 to enable a user (not illustrated) of the hunting blind enclosure 40 to selectively open and close a port opening 60 (FIG. 2) in the hunting blind enclosure 40. Through the port opening 60, the user can view an observation field on the ground and in other areas in the vicinity of the rotatable elevated hunting blind 1, as well as observe or aim and shoot a firearm or arrow (not illustrated) toward wild game within the observation field in hunting applications. An enclosure rotating pedal assembly 82 (FIG. 2) is provided in the hunting blind enclosure 40 generally in front of the seat assembly 24. In operation of the rotatable elevated hunting blind 1, which will be hereinafter described, the seat assembly 24 supports the user (not illustrated) in a sitting position in the hunting blind enclosure 40. The user can selectively manipulate the enclosure rotating pedal assembly 82 typically using his or her foot to facilitate selective rotation of the hunting blind enclosure 40 on the enclosure base 12 and provide the user with a panoramic observation field from the hunting blind enclosure 40 through the port opening 60.

Referring next to FIGS. 1, 2, 21 and 22 of the drawings, multiple enclosure support legs 2 support the enclosure base 12 in an elevated position above the ground or other support surface (not illustrated). In some embodiments, three enclosure support legs 2 deployed in a tripod configuration may support the enclosure base 12, as illustrated. In other embodiments, four or more of the enclosure support legs 2 may support the enclosure base 12. In some embodiments, each enclosure support leg 2 may be multi-segmented with a lower leg section 3 and an upper leg section 8 which detachably engages the lower leg section 3. The upper leg section 8 may be attached to the lower leg section 3 by extending a pin 6 through registering pin openings 5 in the lower leg section 3 and the upper leg section 8, respectively. Feet 4 may terminate the lower leg sections 3 of the respective enclosure support legs 2 to support the enclosure support legs 2 on the ground other other support surface. As illustrated in FIG. 21, multiple step bars 10 may be provided on at least one of the enclosure support legs 2. The step bars 10 support the user (not illustrated) as the user climbs and ascends the enclosure support leg 2 to access the hunting blind enclosure 40, as will be hereinafter described. As further illustrated in FIG. 21, in some embodiments, a level 7 may be provided on at least one of the enclosure support legs 2 to indicate whether or not the enclosure support leg 2 is oriented in a level position in deployment of the rotatable elevated hunting blind 1.

Figure 6:
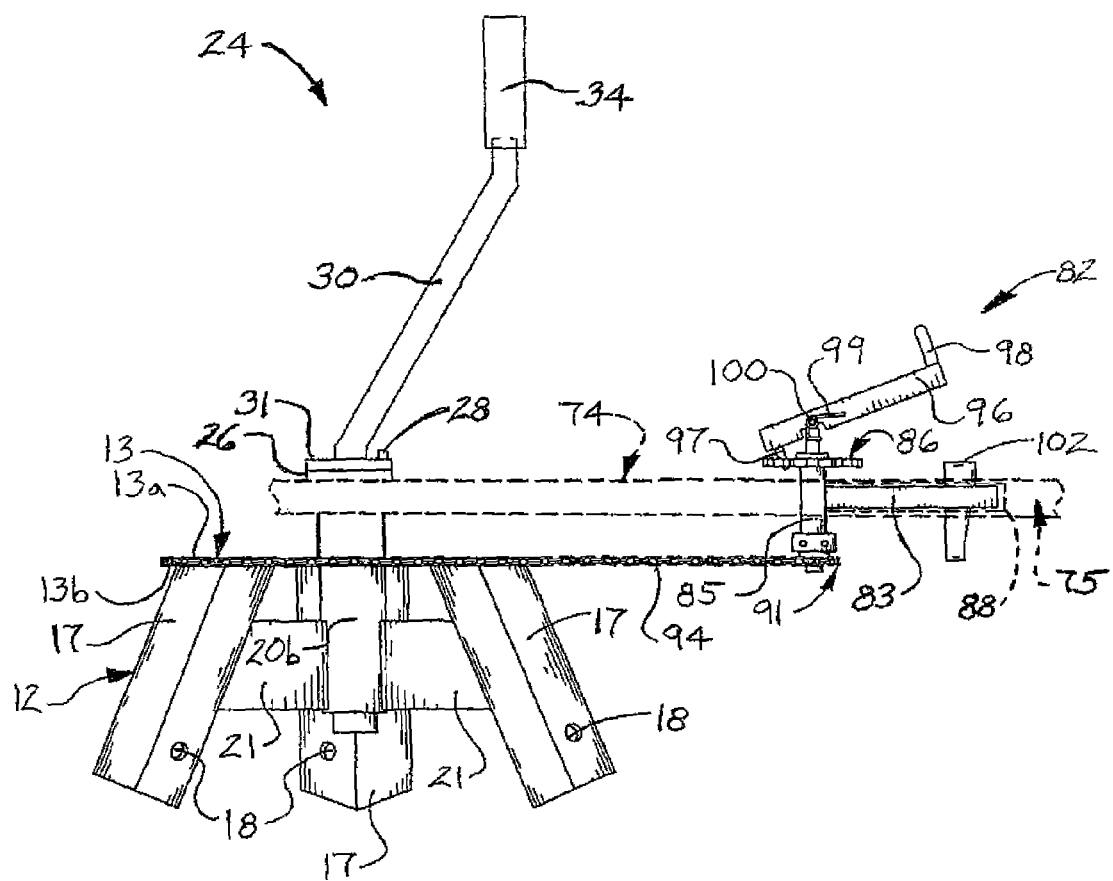
FIG. 6 is a side view of an exemplary enclosure base and an exemplary enclosure rotating pedal assembly operably engaging the enclosure base for revolution of the enclosure rotating pedal assembly about the enclosure base according to an illustrative embodiment of the rotatable elevated hunting blinds.
Figure 7:
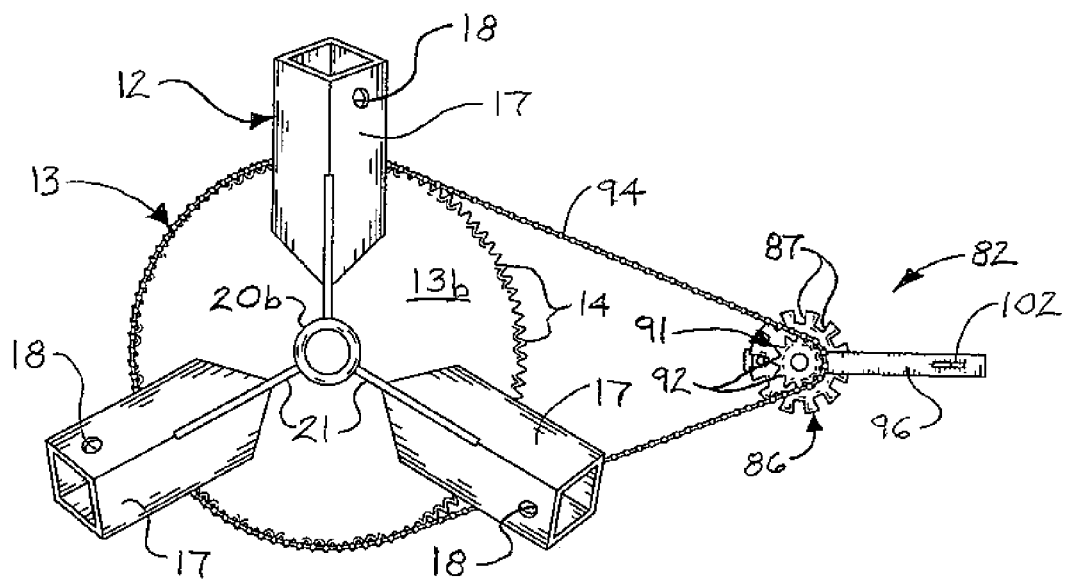
FIG. 7 is a bottom view of the exemplary enclosure base and enclosure rotating pedal assembly.
Figure 8:
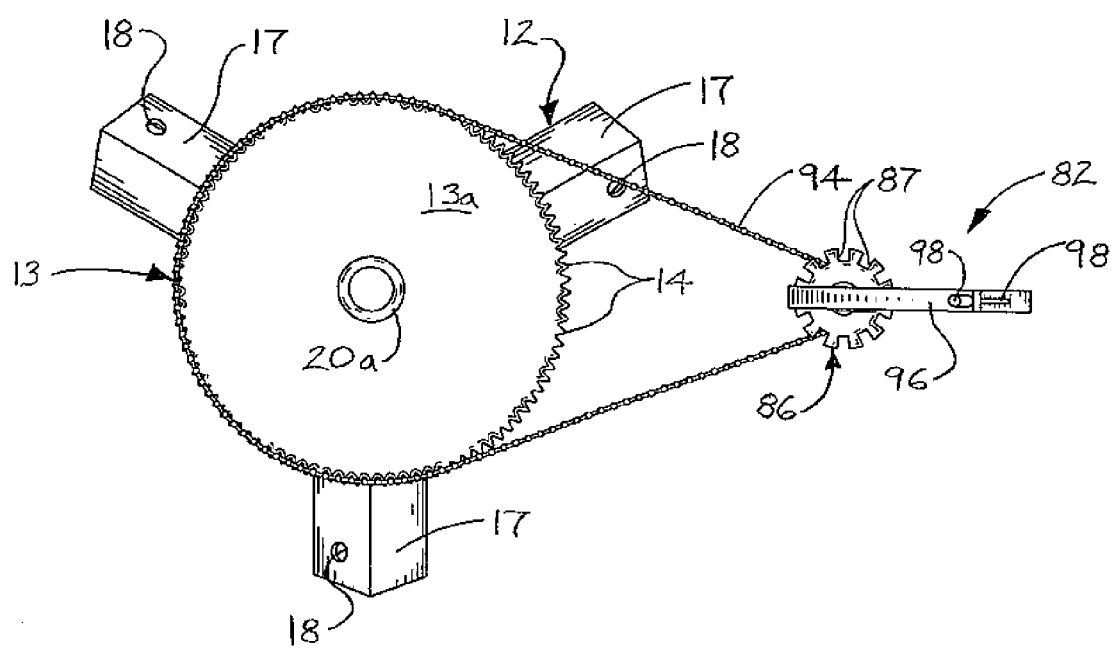
FIG. 8 is a top view of the exemplary enclosure base and enclosure rotating pedal assembly.

Referring next to FIGS. 6-8 of the drawings, the enclosure base 12 of the rotatable elevated hunting blind 1 may include a base sprocket 13 having an upper sprocket surface 13a, a lower sprocket surface 13b and base sprocket teeth 14 (FIGS. 7 and 8). Multiple leg receptacles 17 may extend from the lower sprocket surface 13b of the base sprocket 13. The leg receptacles 17 may be welded and/or otherwise attached to the lower sprocket surface 13b according to the knowledge of those skilled in the art. Each leg receptacle 17 is configured and adapted to receive the upper end of a corresponding enclosure support leg 2. In some embodiments, a pin (not illustrated) may be inserted through a pin opening 18 in the leg receptacle 17 and through a registering pin opening 5 (FIG. 21) in the upper leg section 8 of the enclosure support leg 2 to attach the enclosure support leg 2 to the enclosure base 12. Alternative attachment mechanisms known by those skilled in the art may be used to attach each enclosure support leg 2 to the corresponding leg receptacle 17.

A base sleeve 20 may extend through a base sleeve opening (not illustrated) in the base sprocket 13. The base sleeve 20 may include an upper sleeve portion 20a which protrudes from the upper sprocket surface 13a and a lower sleeve portion 20b which protrudes from the lower sprocket surface 13b of the base sprocket 13. Base sleeve gussets 21 may extend between the lower sleeve portion 20b and each corresponding leg receptacle 17 for reinforcement purposes.

Figure 3:
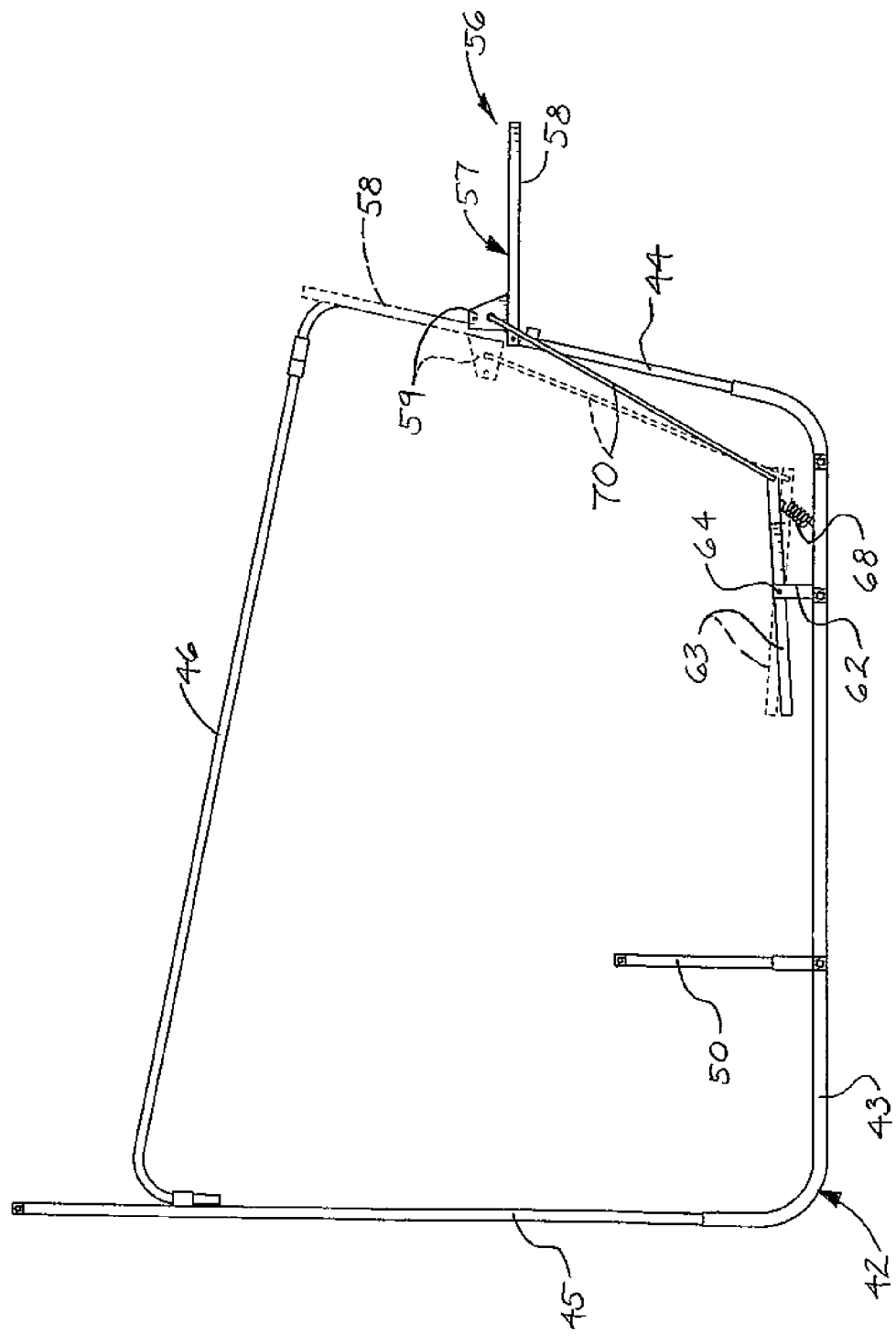
FIG. 3 is a side view of an exemplary enclosure frame of the hunting blind enclosure with the enclosure canopy omitted from the enclosure frame, more particularly illustrating an exemplary port assembly and alternative positions of a port assembly gate in selectively opening and closing of a port opening in the hunting blind enclosure.
Figure 4:
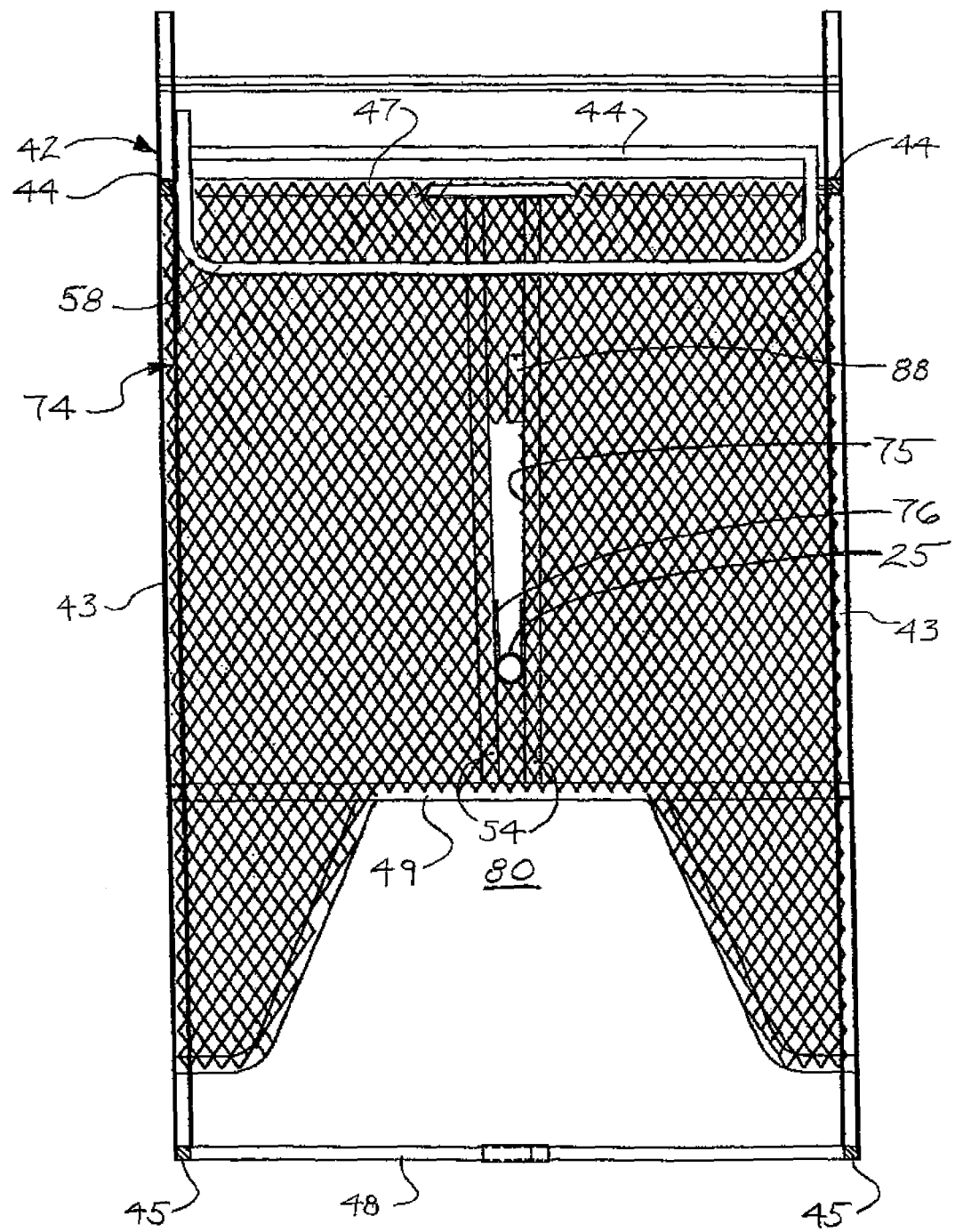
FIG. 4 is a top view of a bottom portion of the enclosure frame according to an illustrative embodiment of the rotatable elevated hunting blinds, with a seat assembly and an enclosure rotating pedal assembly omitted for clarity.
Figure 5:
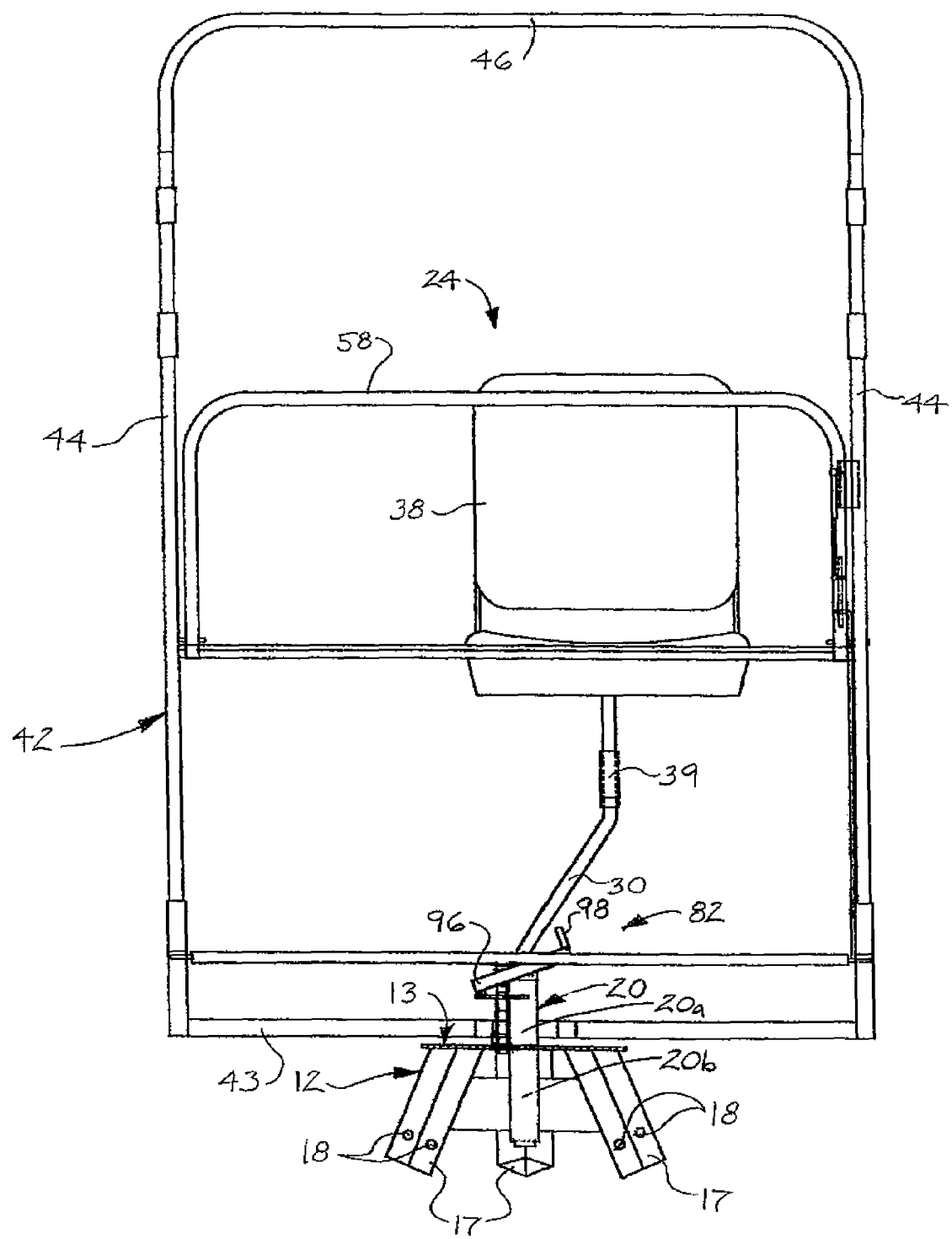
FIG. 5 is a front view of an exemplary hunting blind enclosure with the enclosure canopy removed for clarity.

Referring next to FIGS. 1-5 of the drawings, the hunting blind enclosure 40 of the rotatable elevated hunting blind 1 may include an enclosure frame 42 (FIG. 2). An enclosure canopy 52 (FIG. 1) may be provided on the enclosure frame 42. The enclosure canopy 52 may be fabric, plastic and/or other material and may have a camouflaged pattern in some embodiments. The enclosure canopy 52 may be attached to the enclosure frame 42 using clamps, clips, mechanical fasteners (not illustrated) and/or other attachment techniques which are known by those skilled in the art. In some embodiments, the enclosure frame 42 may include a pair of spaced-apart, elongated and generally parallel bottom frame members 43; a pair of front frame members 44 and a pair of rear frame members 45 extending from the respective bottom frame members 43; and a pair of top frame members 46 extending between the front frame members 44 and the rear frame members 45 on the respective sides of the enclosure frame 42. As illustrated in FIG. 4, a front frame connecting member 47 and a rear frame connecting member 48 may extend between the bottom frame members 43. At least one middle frame connecting member 49 may extend between the bottom frame members 43 between the front frame connecting member 47 and the rear frame connecting member 48. Additional frame connecting members (not illustrated) may extend between the front frame members 44 and/or the rear frame members 45, respectively, for reinforcement purposes.

As further illustrated in FIG. 4, an enclosure platform 74 may be supported by the bottom frame members 43, the front frame connecting member 47, the rear frame connecting member 48 and the middle frame connecting member or members 49. In some embodiments, the enclosure platform 74 may have a mesh construction, as illustrated. In other embodiments, the enclosure platform 74 may have a solid panel construction according to the knowledge of those skilled in the art. An enclosure access space 80 may be provided in the enclosure platform 74 at the rear of the enclosure frame 42. As illustrated in FIG. 2, the enclosure support leg 2 which is fitted with the step bars 10 may register with the enclosure access space 80 to enable the user (not illustrated) to access the hunting blind enclosure 40 through the enclosure access space 80 by climbing the step bars 10. As illustrated in FIGS. 2 and 3, in some embodiments, a safety panel 50 may extend upwardly from the middle frame connecting member 49 in front of the enclosure access space 80 for safety purposes.

As further illustrated in FIG. 4, a pair of generally elongated, parallel, spaced-apart longitudinal frame connecting members 54 may extend between the front frame connecting member 47 and a middle frame connecting member 49. An elongated platform slot 75 may extend through the enclosure platform 74 between the longitudinal frame connecting members 54. A platform bracket 76 may be provided in the platform slot 75 for purposes which will be hereinafter described.

Figure 9:
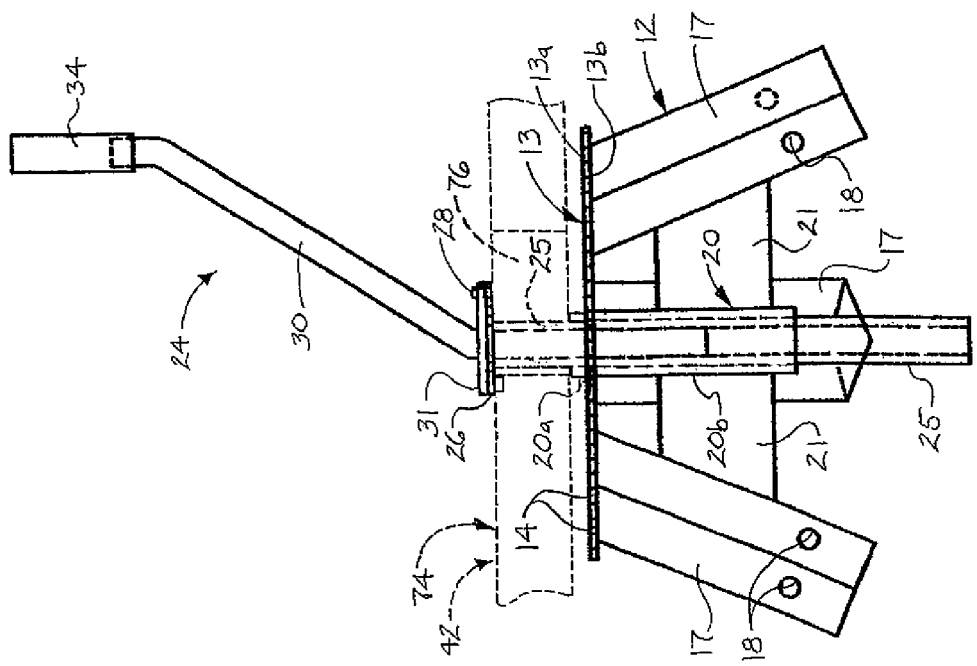
FIG. 9 is a side view of an exemplary enclosure base and seat assembly supported by the enclosure base.

Referring next to FIGS. 4 and 9-12 of the drawings, the seat assembly 24 of the rotatable elevated hunting blind 1 may include a seat sleeve 25 which extends through the base sleeve 20 of the enclosure base 12 such that the seat sleeve 25 is rotatable relative to the base sleeve 20. A seat sleeve cap washer 26 may terminate an upper end of the seat sleeve 25. As illustrated in FIGS. 4 and 9, the seat sleeve 25 may be attached to the platform bracket 76 in the platform slot 75 (FIG. 4) of the enclosure platform 74 such as via welding and/or other suitable attachment technique known by those skilled in the art. Accordingly, the enclosure platform 74 and the attached seat sleeve 25 are rotatable relative to the base sleeve 20 of the enclosure base 12 for purposes which will be hereinafter described.

Figure 12:
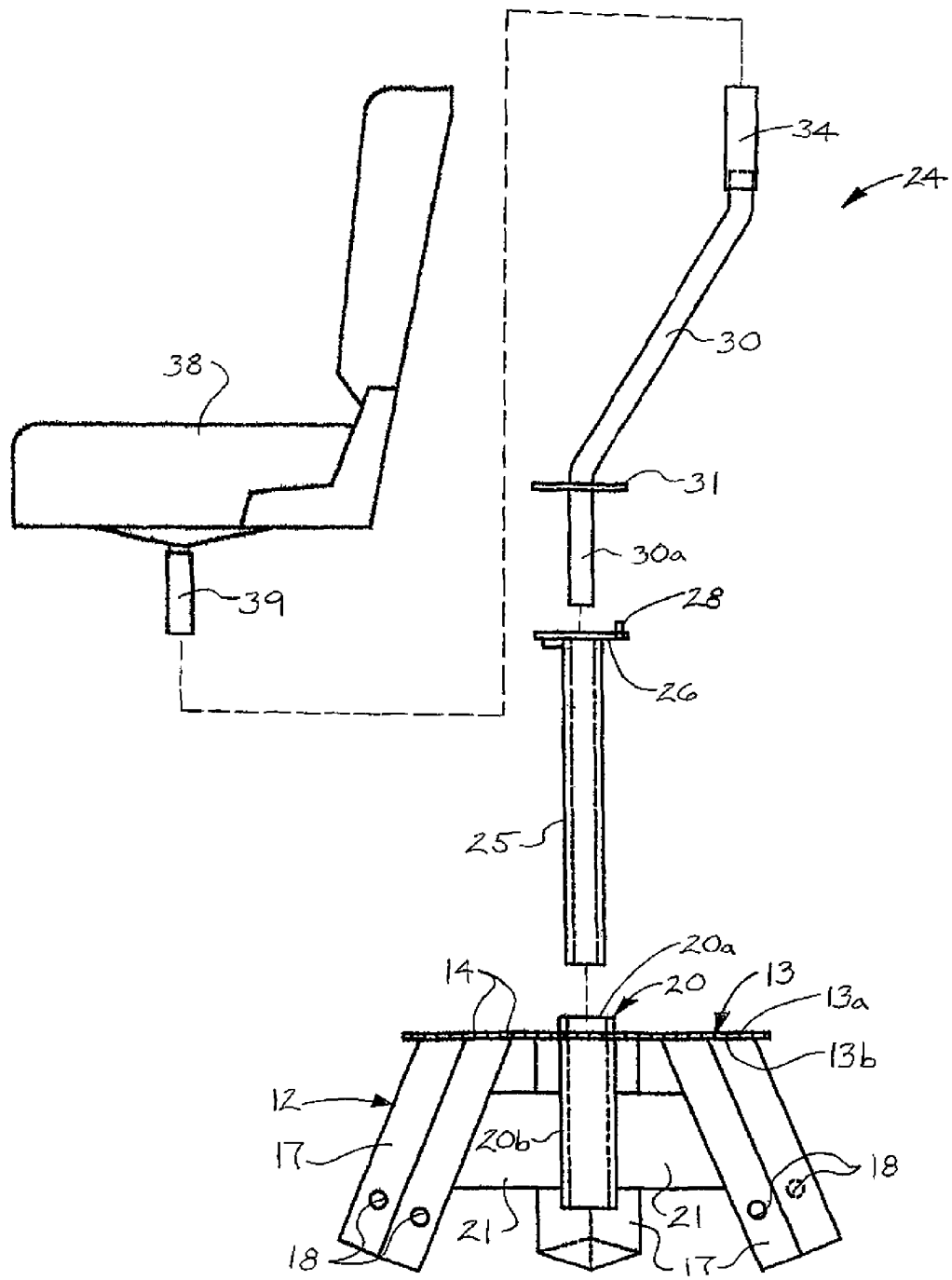
FIG. 12 is an exploded side view of an exemplary seat assembly, more particularly illustrating exemplary attachment of the seat assembly to the enclosure base according to an illustrative embodiment of the rotatable elevated hunting blinds.
Figure 15:
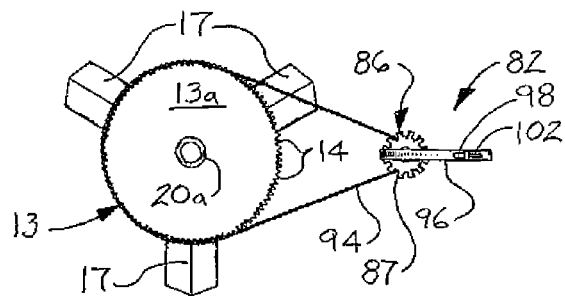
FIGS. 15-18 illustrate revolution of the enclosure rotating pedal assembly about the enclosure base to rotate the hunting blind enclosure in operation of the enclosure rotating pedal assembly.
Figure 16:
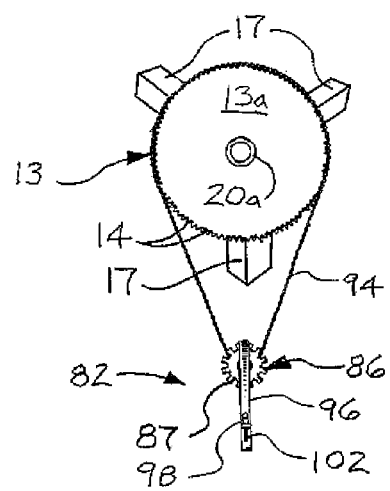
Figure 17:
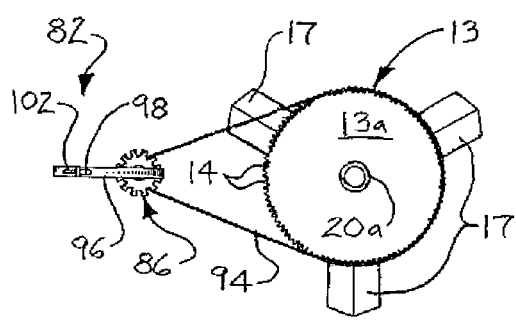
Figure 18:
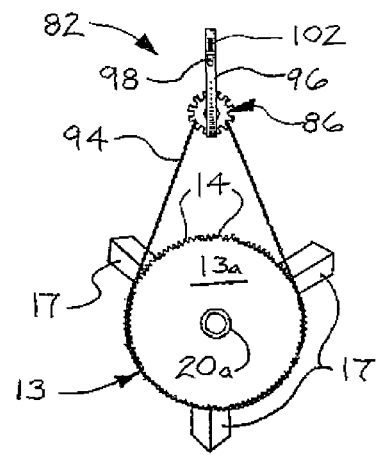

As illustrated in FIG. 12, the seat assembly 24 may further include a seat mount shaft 30 having a shaft lower end 30a which inserts into the seat sleeve 25. A seat mount socket 34 may be provided on an upper end of the seat mount shaft 30. A seat 38 may include a seat mount extension 39 which is inserted in the seat mount socket 34 to mount the seat 38 on the seat mount shaft 30. It will be recognized and understood by those skilled in the art that the seat mount extension 34 and the seat mount shaft 39 heretofore described with respect to FIG. 12 represent one example of a suitable attachment mechanism which is suitable for mounting the seat 38 on the seat mount shaft 30 and that other attachment mechanisms known by those skilled in the art are equally suitable for the purpose.

Figure 10:
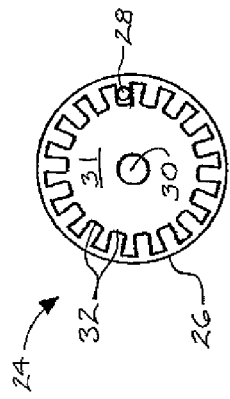
FIG. 10 is a top view of a seat positioning sprocket of the exemplary seat assembly.
Figure 11:
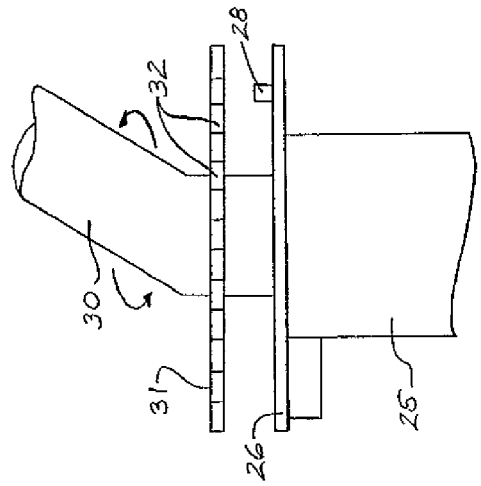
FIG. 11 is a side view, partially in section, of an exemplary mechanism for selective rotational adjustment of the seat assembly on the enclosure base.

In some embodiments, the seat mount shaft 30 may be vertically offset between the shaft lower end 30a and the seat mount socket 34, as illustrated in FIG. 12. A seat positioning sprocket 31 may be provided on the shaft lower end 30a of the seat mount shaft 30. As illustrated in FIG. 10, the seat positioning sprocket 31 has multiple sprocket notches 32. A vertical pin seat mount 28 may extend upwardly from the seat sleeve cap washer 26 which underlies the seat positioning sprocket 31 on the seat sleeve 25. Accordingly, the seat positioning sprocket 31 on the seat mount shaft 30 normally rests on the seat sleeve cap washer 26 on the seat sleeve 25. The vertical pin seat mount 28 extends through one of the sprocket notches 32 in the overlying seat positioning sprocket 31 to prevent inadvertent rotation of the seat mount shaft 30 relative to the seat sleeve 25 and seat sleeve cap washer 26. As illustrated in FIG. 11, the seat mount shaft 30 and the seat positioning sprocket 31 can be selectively raised and rotated relative to the underlying seat sleeve cap washer 26 and vertical pin seat mount 28 to rotationally reposition the seat mount shaft 30 and the seat 38, after which the seat mount shaft 30 is lowered to again rest the seat positioning sprocket 31 on the seat sleeve cap washer 26. The vertical pin seat mount 28 extends through a different sprocket notch 32 in the seat positioning sprocket 31 to selectively lock the seat mount shaft 30 and the seat 38 in the new position.

Referring next to FIGS. 2, 6-8 and 13-20 of the drawings, the enclosure rotating pedal assembly 82 of the rotatable elevated hunting blind 1 may include a pedal assembly shaft 83. A sprocket shaft housing 85 may terminate an end of the pedal assembly shaft 83. A pedal stay sprocket 86 having sprocket notches 87 may be provided on the sprocket shaft housing 85. A sprocket shaft 90 may extend through the sprocket shaft housing 85 such that the sprocket shaft 90 is rotatable relative to the sprocket shaft housing 85. A drive sprocket 91 having sprocket teeth 92 is provided on a lower end of the sprocket shaft 90.

An enclosure rotating pedal 96 is pivotally attached to the sprocket shaft 90. A pedal lock peg 97 may extend downwardly from the enclosure rotating pedal 96. A pedal tab 98 may extend upwardly from the enclosure rotating pedal 96. The enclosure rotating pedal 96 is pivotally positional between a non-functional lock position in which the pedal lock peg 97 inserts into one of the sprocket notches 87 of the pedal stay sprocket 86, as illustrated, and a functional unlock position in which the enclosure rotating pedal 96 is oriented generally horizontally. A pedal spring 99, typically mounted on a spring pin 100, may normally bias the enclosure rotating pedal 96 in the non-functional lock position illustrated in the drawings. Accordingly, in the functional position, the enclosure rotating pedal 96 can be selectively rotated to turn the sprocket shaft 90 in the sprocket shaft housing 85. The sprocket shaft 90 rotates the attached drive sprocket 91 for purposes which will be hereinafter described.

Figure 20:
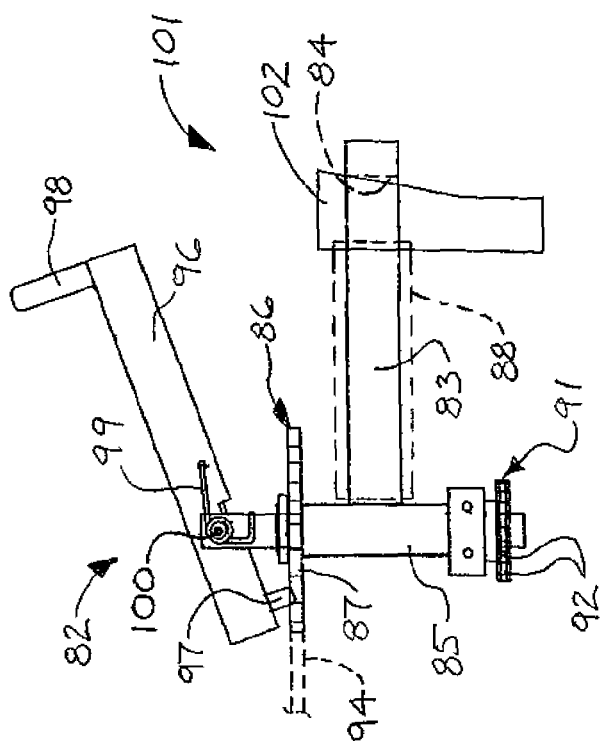
FIG. 20 is a side view of the exemplary enclosure rotating pedal assembly having a chain tensioning mechanism, with the assembly deployed in a chain-tensioning position.
Figure 19:
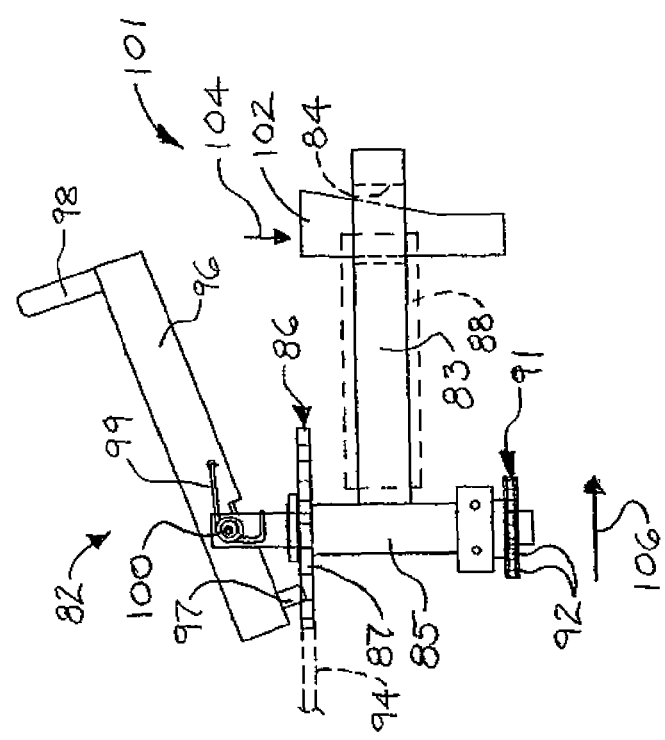
FIG. 19 is a side view of an exemplary enclosure rotating pedal assembly having a chain tensioning mechanism, with the assembly deployed in a chain-loosening position.

The enclosure rotating pedal assembly 82 is mounted on the enclosure platform 74 (FIG. 4) of the hunting blind enclosure 40. As illustrated in FIGS. 19 and 20, in some embodiments, a shaft mount sleeve 88 may be mounted in the platform slot 75 (FIG. 4) of the enclosure platform 74 in spaced-apart relationship to the seat sleeve 25 of the seat assembly 24. The pedal assembly shaft 83 of the pedal assembly 82 may extend through the shaft mount sleeve 88 in sliding relationship to the shaft mount sleeve 88 and is deployed within the plane of the enclosure platform 74. Thus, the pedal stay sprocket 86 and the enclosure rotating pedal 96 are disposed above and the drive sprocket 91 is disposed beneath the plane of the enclosure platform 74. As illustrated in FIGS. 6-8, the drive sprocket 91 of the enclosure rotating pedal assembly 82 is disposed in spaced-apart relationship and within a common horizontal plane with the base sprocket 13 of the enclosure base 12. A continuous chain 94 meshes with the base sprocket teeth 14 of the base sprocket 13 and the drive sprocket teeth 92 of the drive sprocket 91. As will be hereinafter described, in operation of the rotatable elevated hunting blind 1, the user (not illustrated) sits on the seat 38 of the seat assembly 24. The user places his or her foot on the enclosure rotating pedal 96 and uses his or her foot to disengage the pedal lock peg 97 from the pedal stay sprocket 86 by pivoting the enclosure rotating pedal 96 from the non-functional to the functional position and then rotating the enclosure rotating pedal 96. Therefore, as illustrated in FIGS. 15-18, the enclosure rotating pedal 96 rotates the drive sprocket 91 through the sprocket shaft 90. As the chain 94 remains stationary with the base sprocket 13, the drive sprocket 91 meshes with and travels along the chain 94 and revolves around the base sprocket 13 responsive to rotation of the enclosure rotating pedal 96. Thus, the hunting blind enclosure 40, attached to the enclosure rotating pedal assembly 82 typically at the shaft mount sleeve 88 (FIGS. 19 and 20), rotates with respect to the base sprocket 13 as the seat sleeve 25 of the seat assembly 24, attached to the platform bracket 76 (FIG. 4) on the enclosure frame 42, rotates relative to the base sleeve 20 of the enclosure base 12. The seat mount shaft 30 and the seat 38 rotate with the seat sleeve 25 and the enclosure frame 42. Therefore, the user faces the port opening 60 in the front end of the hunting blind enclosure 40 to enable the user to view a panoramic observation field through the port opening 60 outside hunting blind enclosure 40 as the hunting blind enclosure 40 rotates about the enclosure base 12.

As illustrated in FIGS. 19 and 20, in some embodiments, the enclosure rotating pedal assembly 82 may include a chain tensioning mechanism 101 which facilitates selective tensioning of the chain 94 between the base sprocket 13 of the enclosure base 12 and the drive sprocket 91 of the enclosure rotating pedal assembly 82. The chain tensioning mechanism 101 may include a chain tensioning wedge opening 84 which extends through the pedal assembly shaft 83 of the enclosure rotating pedal assembly 82. A chain tensioning wedge 102 extends through the chain tensioning wedge opening 84. The chain tensioning wedge 102 can be progressively pushed downwardly into the chain tensioning wedge opening 84 (arrow 104 in FIG. 19) such that the chain tensioning wedge 102 progressively increases pressure between the shaft mount sleeve 88 and the pedal assembly shaft 83 and wedges or pushes the enclosure rotating pedal assembly 82 away from the enclosure base 12 (arrow 106 in FIG. 19). Therefore, the drive sprocket 91 of the enclosure rotating pedal assembly 82 travels away from the base sprocket 13 of the enclosure base 12, tensioning the chain 94 between the base sprocket 13 and the drive sprocket 91. The chain tensioning wedge 102 can be selectively raised in the chain tensioning wedge opening 84 such that the chain tensioning wedge 102 progressively releases pressure between the shaft mount sleeve 88 and the pedal assembly shaft 83 and slackens the chain 94 between the base sprocket 13 and the drive sprocket 91.

It will be recognized and understood that the foregoing description of the enclosure rotating pedal assembly 82 represents one non-limiting example of a blind enclosure rotation mechanism which is suitable for the purpose of rotating the hunting blind enclosure 40 on the enclosure base 12 responsive to input by the user of the hunting blind enclosure 40. Such a blind enclosure rotation mechanism may include transmitting rotation from the enclosure rotating pedal 96 to the drive sprocket 91, as was heretofore described with respect to the enclosure rotating pedal assembly 82. Any alternative blind enclosure rotation mechanism which is suitable for rotating the drive sprocket 91 responsive to user input may be used instead. For example and without limitation, in some embodiments the enclosure rotating pedal assembly 82 may be replaced by a hand-operated or motorized blind enclosure rotation mechanism which operably engages the drive sprocket 91 for rotation responsive to input by the user.

Referring next to FIGS. 1-5 of the drawings, the port assembly 56 of the rotatable elevated hunting blind 1 may include a pair of spaced-apart pedal flanges 62 (one of which is illustrated in FIGS. 2 and 3) which extend upwardly from the respective bottom frame members 43 of the enclosure frame 42. A gate control pedal 63 may be pivotally attached to the pedal flanges 62 via pedal pivots 64. A port assembly gate 57 may include a generally elongated gate frame 58 having a pair of spaced-apart gate frame flanges 59 pivotally attached to the respective front frame members 44 of the enclosure frame 42. A portion of the enclosure canopy 52 (FIG. 1) may be provided on the gate frame 58. At least one connecting rod 70 may connect the gate control pedal 63 to the gate frame flange 59 of the gate frame 58. Accordingly, the gate control pedal 63 can be selectively pivoted between an open position illustrated in solid lines in FIG. 3 and in which the attached port assembly gate 57 is deployed in an open position to expose the port opening 60 and a closed position illustrated in phantom lines in FIG. 3 and in which the port assembly gate 57 is deployed in a closed position to close the port opening 60. At least one pedal return spring 68 may engage the corresponding bottom frame member 43 and the gate control pedal 63 in front of the pedal pivot 64 to normally maintain the gate control pedal 63 and the port assembly gate 57 in the closed positions. Therefore, in operation of the rotatable elevated hunting blind 1, which will be hereinafter further described, the user (not illustrated) of the hunting blind enclosure 40 can selectively manipulate the gate control pedal 63 with his or her foot to configure the port assembly gate 57 between the open and closed positions.

In exemplary application, the rotatable elevated hunting blind 1 is erected on the ground or other support surface (not illustrated) by assembling the enclosure support legs 2 on the ground or support surface and assembling the enclosure base 12 and hunting blind enclosure 40 on the enclosure support legs 2. The feet 4 on the respective support legs 2 rest on the ground or support surface. In some embodiments, the level 7 (FIGS. 21 and 22) on one of the support legs 2 may indicate whether the support legs 2 rest on level ground. A user (not illustrated) climbs the step bars 10 on the enclosure support leg 2 and enters the hunting blind enclosure 40 through the enclosure access space 80 (FIG. 4) in the enclosure platform 74 at the rear end of the enclosure frame 42. The user climbs from the upper end of the support leg 2 over the safety panel 50 (FIGS. 2 and 3) and stands on the enclosure platform 74, and then sits in the seat 38 of the seat assembly 24. Prior to sitting, the user can adjust the position of the seat 38 according to the preferences of the user by lifting the seat mount shaft 30 to disengage the vertical pin seat mount 28 (FIG. 11) from the sprocket notch 32 of the seat positioning sprocket 31, rotating the seat mount shaft 30 and lowering the seat positioning sprocket 31 back onto the seat sleeve cap washer 26 with the vertical pin seat mount 28 extending through another of the sprocket notches 32 to lock the seat mount shaft 30 in place at the new position, as was heretofore described.

As he or she sits in the seat 38, the user can selectively deploy the port assembly gate 57 of the port assembly 56 from the closed position indicated by the phantom lines to the open position indicated by the solid lines in FIG. 3 by depressing the gate control pedal 63, against the bias imparted by the pedal return spring 68, using the user's feet. The user can selectively rotate the hunting blind enclosure 40 about the enclosure base 12 by operating the enclosure rotating pedal assembly 82. This is accomplished by initially pivoting the enclosure rotating pedal 96 from the non-functional angled position illustrated in FIGS. 2, 5 and 6 to the functional horizontal position, against the bias imparted by the pedal spring 99 (FIG. 19), as the pedal lock peg 97 disengages the sprocket notch 87 of the pedal stay sprocket 86. The user then rotates the enclosure rotating pedal 96 in the clockwise or counterclockwise direction using his or her foot to facilitate clockwise or counterclockwise rotation, respectively, of the hunting blind enclosure 40. Accordingly, rotation of the enclosure rotating pedal 96 facilitates corresponding rotation of the drive sprocket 91 such that the drive sprocket 91 travels around the chain 94 as the chain 94 remains stationary with the base sprocket 13 of the enclosure base 12, as was heretofore described with respect to FIGS. 15-18. Therefore, the rotating hunting blind enclosure 40 provides the user with a 360-degree panoramic observation field through the open port opening 60 of the port assembly 56. In some embodiments, prior to operation of the enclosure rotating pedal assembly 82, the user can selectively tension the chain 94 using the chain tensioning mechanism 101 as was heretofore described with respect to FIGS. 19 and 20.

In the event that the user spots wild game in the observation field, the user stops rotation of the hunting blind enclosure 40 and can observe the game, or aim and shoot at the game through the open port opening 60 in hunting applications. The user can selectively close the port assembly gate 57 in the port opening 60 of the port assembly 56 for concealment purposes by releasing the gate control pedal 63, whereupon the pedal return spring 68 (FIG. 3) pivotally returns the gate control pedal 63 to the closed position. As it closes, the gate control pedal 63 pivotally closes the port assembly gate 57 in the port opening 60 through the connecting rod 70.

While illustrative embodiments of the disclosure have been described above, it will be recognized and understood that various modifications can be made and the appended claims are intended to cover all such modifications which may fall within the spirit and scope of the disclosure.

What is claimed is:

1. A rotatable elevated hunting blind, comprising:
a plurality of enclosure support legs;
an enclosure base carried by the enclosure support legs, the enclosure base having a stationary base sprocket;
a hunting blind enclosure carried by the enclosure base, the hunting blind enclosure rotatable with respect to the enclosure base;
a seat assembly having a seat carried by the hunting blind enclosure;
a user-operable blind enclosure rotation mechanism carried by the hunting blind enclosure adjacent to the seat of the seat assembly, the blind enclosure rotation mechanism having a drive sprocket and a chain meshing with the base sprocket of the enclosure base and the drive sprocket, the blind enclosure rotation mechanism including a foot-operable enclosure rotating pedal assembly operable to rotate the drive sprocket within the chain as the blind enclosure rotation mechanism revolves around the enclosure base, the enclosure rotating pedal assembly including:
a sprocket shaft housing carried by the hunting blind enclosure;
a rotatable sprocket shaft extending through the sprocket shaft housing and drivingly engaging the drive sprocket;
an enclosure rotating pedal drivingly engaging the sprocket shaft;
a pedal stay sprocket having a plurality of sprocket notches, the enclosure rotating pedal pivotally carried by the sprocket shaft and positional in a non-functional lock position in which the enclosure pedal engages the pedal stay sprocket and a functional unlock position in which the enclosure pedal disengages the pedal stay sprocket; and
a shaft mount sleeve carried by the hunting blind enclosure;
a pedal assembly shaft slidably disposed in the shaft mount sleeve, the sprocket shaft housing carried by the shaft mount sleeve; and
a chain tensioning mechanism engaging the pedal assembly shaft and the shaft mount sleeve.

2. The rotatable elevated hunting blind of claim 1 wherein the chain tensioning mechanism comprises a chain tensioning wedge opening extending through the pedal assembly shaft adjacent to the shaft mount sleeve and a chain tensioning wedge inserted in the chain tensioning wedge opening and engaging the pedal assembly shaft.

3. The rotatable elevated hunting blind of claim 1 wherein the enclosure base further comprises a plurality of leg receptacles carried by the base sprocket and receiving the plurality of enclosure support legs, respectively, and a base sleeve carried by the base sprocket, and wherein the seat assembly comprises a seat sleeve rotatable in the base sleeve of the enclosure base, the hunting blind enclosure carried by and rotatable with the seat sleeve; a seat mount shaft carried by the seat sleeve; and the seat carried by the seat mount shaft.

4. The rotatable elevated hunting blind of claim 3 further comprising a seat sleeve cap washer carried by the seat sleeve, a vertical pin seat mount carried by the seat sleeve cap washer and a seat positioning sprocket having a plurality of sprocket notches carried by the seat mount shaft and normally resting on the seat sleeve cap washer with the vertical pin seat mount extending through one of the plurality of sprocket notches.

5. A rotatable elevated hunting blind, comprising:
a plurality of enclosure support legs, at least one of the plurality of enclosure support legs having a plurality of step bars;
an enclosure base carried by the enclosure support legs, the enclosure base having a stationary base sprocket;
a hunting blind enclosure carried by the enclosure base, the hunting blind enclosure rotatable with respect to the enclosure base and including;
an enclosure platform;
an enclosure access notch in the enclosure platform, the enclosure access notch generally registering with the at least one of the plurality of enclosure support legs having the plurality of step bars; and
a safety panel upward-standing from the enclosure platform adjacent to the enclosure access notch;
a seat assembly having a seat carried by the hunting blind enclosure; and
a user-operable blind enclosure rotation mechanism carried by the hunting blind enclosure adjacent to the seat of the seat assembly, the blind enclosure rotation mechanism having a drive sprocket and a chain meshing with the base sprocket of the enclosure base and the drive sprocket, the blind enclosure rotation mechanism including a foot-operable enclosure rotating pedal assembly operable to rotate the drive sprocket within the chain as the blind enclosure rotation mechanism revolves around the enclosure base, the enclosure rotating pedal assembly including;
a sprocket shaft housing carried by the hunting blind enclosure;
a rotatable sprocket shaft extending through the sprocket shaft housing and drivingly engaging the drive sprocket;
an enclosure rotating pedal drivingly engaging the sprocket shaft;
a shaft mount sleeve carried by the hunting blind enclosure;
a pedal assembly shaft slidably disposed in the shaft mount sleeve, the sprocket shaft housing carried by the shaft mount sleeve; and
a chain tensioning mechanism engaging the pedal assembly shaft and the shaft mount sleeve.

6. The rotatable elevated hunting blind of claim 5 further comprising a pedal stay sprocket having a plurality of sprocket notches, and wherein the enclosure rotating pedal is pivotally carried by the sprocket shaft and positional in a non-functional lock position in which the enclosure pedal engages the pedal stay sprocket and a functional unlock position in which the enclosure pedal disengages the pedal stay sprocket.

7. The rotatable elevated hunting blind of claim 5 wherein the chain tensioning mechanism comprises a chain tensioning wedge opening extending through the pedal assembly shaft adjacent to the shaft mount sleeve and a chain tensioning wedge inserted in the chain tensioning wedge opening and engaging the pedal assembly shaft.

8. The rotatable elevated hunting blind of claim 5 wherein the enclosure base further comprises a plurality of leg receptacles carried by the base sprocket and receiving the plurality of enclosure support legs, respectively, and a base sleeve carried by the base sprocket, and wherein the seat assembly comprises a seat sleeve rotatable in the base sleeve of the enclosure base, the hunting blind enclosure carried by and rotatable with the seat sleeve; a seat mount shaft carried by the seat sleeve; and a seat carried by the seat mount shaft.

9. The rotatable elevated hunting blind of claim 8 further comprising a seat sleeve cap washer carried by the seat sleeve, a vertical pin seat mount carried by the seat sleeve cap washer and a seat positioning sprocket having a plurality of sprocket notches carried by the seat mount shaft and normally resting on the seat sleeve cap washer with the vertical pin seat mount extending through one of the plurality of sprocket notches.

10. A rotatable elevated hunting blind, comprising:
   a plurality of enclosure support legs, at least one of the plurality of enclosure support legs having a plurality of step bars;
   an enclosure base carried by the enclosure support legs, the enclosure base having a stationary base sprocket;
   a hunting blind enclosure carried by the enclosure base, the hunting blind enclosure rotatable with respect to the enclosure base and including:
      an enclosure frame;
      an enclosure canopy carried by the enclosure frame;
      an enclosure platform carried by the enclosure frame;
      an enclosure access notch in the enclosure platform, the enclosure access notch generally registering with the at least one of the plurality of enclosure support legs having the plurality of step bars; and
      a safety panel upward-standing from the enclosure platform adjacent to the enclosure access notch;
   a seat assembly having a seat carried by the hunting blind enclosure;
   a user-operable blind enclosure rotation mechanism carried by the hunting blind enclosure adjacent to the seat of the seat assembly, the blind enclosure rotation mechanism having a drive sprocket and a chain meshing with the base sprocket of the enclosure base and the drive sprocket, the blind enclosure rotation mechanism operable to rotate the drive sprocket within the chain as the blind enclosure rotation mechanism revolves around the enclosure base; and
   a port assembly including:
      a port opening in the hunting blind enclosure;
      a port assembly gate carried by the enclosure frame, the port assembly gate positional between open and closed positions with respect to the port opening; and
      a gate control pedal pivotally carried by the enclosure frame, the gate control pedal operably engaging the port assembly gate and positional between open and closed positions to selectively pivot the port assembly gate between the open and closed positions, respectively.

11. The rotatable elevated hunting blind of claim 10 further comprising a pedal return spring engaging the gate control pedal and normally biasing the gate control pedal in the closed position.

12. The rotatable elevated hunting blind of claim 10 wherein the blind enclosure rotation mechanism comprises a foot-operable enclosure rotating pedal assembly including a sprocket shaft housing carried by the hunting blind enclosure, a rotatable sprocket shaft extending through the sprocket shaft housing and drivingly engaging the drive sprocket and an enclosure rotating pedal drivingly engaging the sprocket shaft.

13. The rotatable elevated hunting blind of claim 12 further comprising a pedal stay sprocket having a plurality of sprocket notches, and wherein the enclosure rotating pedal is pivotally carried by the sprocket shaft and positional in a non-functional lock position in which the enclosure pedal engages the pedal stay sprocket and a functional unlock position in which the enclosure pedal disengages the pedal stay sprocket.

\* \* \* \* \*